(12) United States Patent
Al-Rasheed et al.

(10) Patent No.: US 11,335,199 B2
(45) Date of Patent: May 17, 2022

(54) PARKING CONTROL SYSTEM, PARKING CONTROL METHOD, AND MOBILE ROBOT DEVICE

(71) Applicant: SAUDI ARABIAN OIL COMPANY, Dhahran (SA)

(72) Inventors: Hussain A. Al-Rasheed, Dhahran (SA); Dima M. Alalharith, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/848,348

(22) Filed: Apr. 14, 2020

(65) Prior Publication Data

US 2021/0319699 A1 Oct. 14, 2021

(51) Int. Cl.
*G08G 1/14* (2006.01)
*B25J 9/00* (2006.01)

(52) U.S. Cl.
CPC ............ *G08G 1/147* (2013.01); *B25J 9/0084* (2013.01)

(58) Field of Classification Search
None
See application file for complete search history.

(56) References Cited

U.S. PATENT DOCUMENTS

| | | | |
|---|---|---|---|
| 7,791,501 B2 | 9/2010 | Ioli | |
| 9,773,413 B1* | 9/2017 | Li | G08G 1/144 |
| 10,163,016 B2* | 12/2018 | Hayakawa | G08G 1/143 |
| 10,192,440 B2* | 1/2019 | Hohenacker | G06K 9/325 |
| 10,311,731 B1* | 6/2019 | Li | G08G 1/146 |
| 10,726,723 B1* | 7/2020 | Madden | G07B 15/04 |

(Continued)

FOREIGN PATENT DOCUMENTS

| | | |
|---|---|---|
| CN | 104112299 A | 10/2014 |
| CN | 104181869 A | 12/2014 |

(Continued)

OTHER PUBLICATIONS

Faheem et al. "A Survey of Intelligent Car Parking System", Journal of Applied Research and Technology, vol. 11, Oct. 2013, pp. 714-726 (13 pages).

(Continued)

*Primary Examiner* — Fekadeselassie Girma
(74) *Attorney, Agent, or Firm* — Osha Bergman Watanabe & Burton LLP

(57) ABSTRACT

A parking control system includes a cloud server, a sensor coupled to a parking spot, and a mobile robot device. The sensor detects a vehicle entering the parking spot, and transmits a first signal to the cloud server. The cloud server, upon reception of the first signal, records an entry time of the vehicle, and dispatches the mobile robot device to the parking spot. The mobile robot device captures identification information of the vehicle by a camera, and transmits a second signal including the identification information to the cloud server. The sensor detects the vehicle exiting the parking spot, and transmits a third signal to the cloud server. The cloud server, upon reception of the third signal, records an exit time of the vehicle. The cloud server calculates a parking duration between the entry time and the exit time, and determines whether the parking duration has exceeded a predetermined duration.

19 Claims, 10 Drawing Sheets

(56) References Cited

U.S. PATENT DOCUMENTS

| | | | | |
|---|---|---|---|---|
| 2012/0233062 | A1* | 9/2012 | Cornish | B60L 53/65 |
| | | | | 705/39 |
| 2014/0207280 | A1* | 7/2014 | Duffley | A47L 9/2857 |
| | | | | 700/257 |
| 2017/0185956 | A1 | 6/2017 | Gollu | |
| 2018/0174455 | A1* | 6/2018 | Mirasol Gieb | G07F 17/246 |
| 2018/0261084 | A1* | 9/2018 | Tsai | G08G 1/0116 |
| 2019/0236953 | A1* | 8/2019 | Peters | G08G 1/143 |
| 2019/0315240 | A1* | 10/2019 | Wu | H02J 50/10 |
| 2020/0061839 | A1* | 2/2020 | Deyle | B25J 9/1664 |
| 2020/0139836 | A1* | 5/2020 | Sato | B60L 53/16 |
| 2020/0242933 | A1* | 7/2020 | Brudner | G08G 1/146 |
| 2020/0269425 | A1* | 8/2020 | Shikano | B25J 9/1679 |
| 2021/0405646 | A1* | 12/2021 | Park | G05D 1/0225 |

FOREIGN PATENT DOCUMENTS

| | | | |
|---|---|---|---|
| CN | 106204756 | A | 12/2016 |
| CN | 106204759 | A | 12/2016 |
| CN | 106297399 | A | 1/2017 |
| CN | 107341856 | A | 11/2017 |
| CN | 107492252 | A | 12/2017 |
| CN | 107730612 | A | 2/2018 |
| CN | 107886761 | A | 4/2018 |
| CN | 107993482 | A | 5/2018 |
| CN | 108010375 | A | 5/2018 |
| CN | 108257231 | A | 7/2018 |
| CN | 108269423 | A | 7/2018 |
| CN | 108335520 | A | 7/2018 |
| CN | 108346295 | A | 7/2018 |
| CN | 108615398 | A | 10/2018 |
| CN | 108711303 | A | 10/2018 |
| CN | 108766015 | A | 11/2018 |
| CN | 108806310 | A | 11/2018 |
| CN | 109272753 | A | 1/2019 |
| CN | 109615904 | A | 4/2019 |
| CN | 109841085 | A | 6/2019 |
| DE | 102015208161 | A1 | 11/2016 |
| GB | 2567618 | A | 4/2019 |
| KR | 101860302 | B1 | 5/2018 |
| WO | 2015080470 | A1 | 6/2015 |

OTHER PUBLICATIONS

Al-Kharusi, Hilal and Ibrahim Al-Bahadly, "Intelligent Parking Management System Based on Image Processing", World Journal of Engineering and Technology, Scientific Research Publishing Inc., vol. 2, 2014, 55-67 (13 pages).

International Search Report issued in corresponding International Application No. PCT/US2020/030419, dated Dec. 23, 2020 (4 pages).

Written Opinion issued in corresponding International Application No. PCT/US2020/030419, dated Dec. 23, 2020 (8 pages).

\* cited by examiner

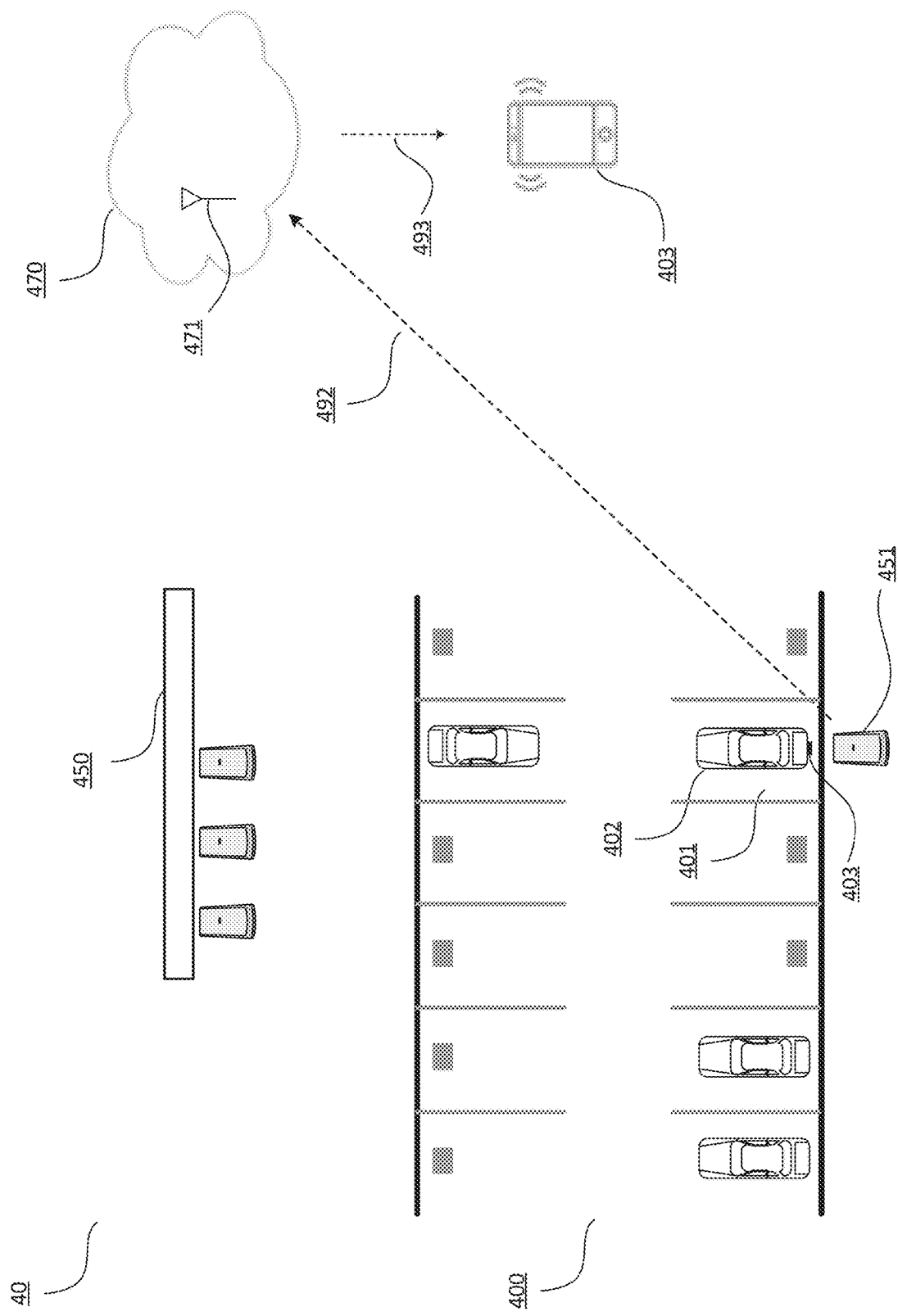

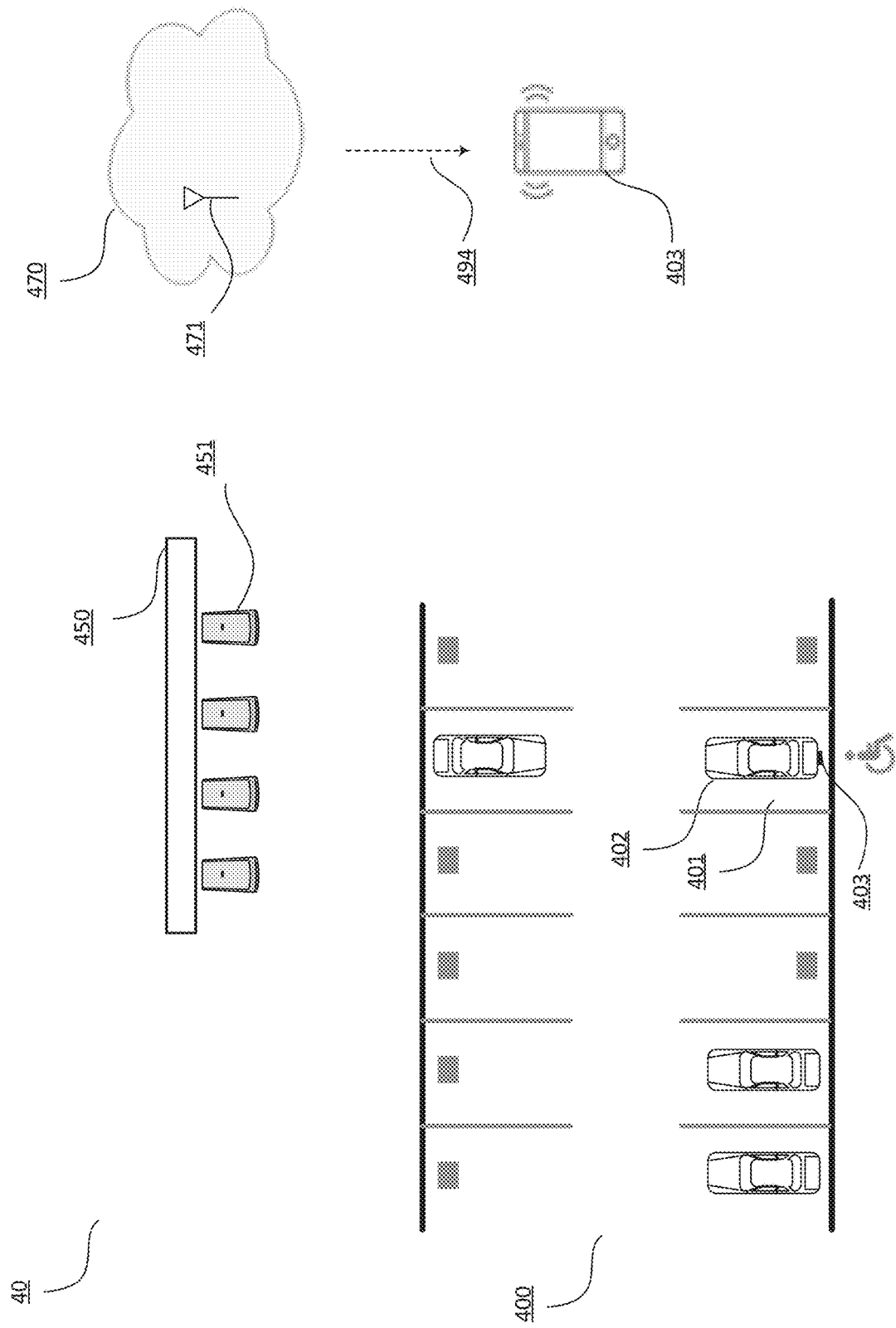

PARKING CONTROL SYSTEM, PARKING CONTROL METHOD, AND MOBILE ROBOT DEVICE

BACKGROUND OF INVENTION

Field of the Invention

The invention relates generally to smart city. More specifically, the invention generally relates to technologies used in a smart parking control system and a smart parking control method.

Background Art

The concept of "smart city" has emerged in recent years as the technology of Internet-of-Things (IoT) develops. While there is no scientific definition of a smart city, it is generally believed that a smart city, compared with a traditional city, should have a higher level of automation and better form of coordination in city infrastructure so as to bring convenience and efficiency to people's life.

Park infrastructure is an important component of a city. In a conceptual smart city, it is desired that parking control be conducted "smartly," with an increased level of automation and an improved level of coordination between parkers, parking property management, and city regulators. Accordingly, there have been studies on various aspects of "smart parking" ranging from detecting parking authorization, measuring parking time, billing, and enforcing parking regulations in case of violations.

SUMMARY OF INVENTION

In one aspect, the disclosure relates to a parking control method. The includes: detecting, by a sensor coupled to a parking spot in a parking lot, a vehicle entering the parking spot; transmitting, by the sensor and to a cloud server, a first wireless signal; recording, by the cloud server upon reception of the first wireless signal, an entry time of the vehicle; dispatching, by the cloud server, a mobile robot device to the parking spot; capturing, by the mobile robot device, identification information of the vehicle using a camera; transmitting, by the mobile robot device and to the cloud server, a second wireless signal including the identification information of the vehicle; detecting, by the sensor, the vehicle exiting the parking spot; transmitting, by the sensor and to the cloud server, a third wireless signal; recording, by the cloud server upon reception of the third wireless signal, an exit time of the vehicle; calculating, by the cloud server, a parking duration between the entry time and the exit time; and determining, based on the identification information and the parking duration, whether the parking duration has exceeded a predetermined duration.

In another aspect, the disclosure relates to a parking control system. The parking control system includes: a cloud server coupled to a transceiver; a sensor including a sensing circuit and a transmitter, the sensor being coupled to a parking spot in a parking lot; and a mobile robot device including a transceiver and a camera. The sensor detects, by the sensing circuit, a vehicle entering the parking spot, and transmits, by the transmitter and to the cloud server, a first wireless signal. The cloud server, upon reception of the first wireless signal by the transceiver of the cloud server, records an entry time of the vehicle, and dispatches the mobile robot device to the parking spot. The mobile robot device captures identification information of the vehicle by the camera, and transmits, by the transceiver of the mobile robot device and to the cloud server, a second wireless signal including the identification information. The sensor further detects, by the sensing circuit, the vehicle exiting the parking spot, and transmits, by the transmitter and to the cloud server, a third wireless signal. The cloud server, upon reception of the third wireless signal by the transceiver of the cloud server, records an exit time of the vehicle. The cloud server further calculates a parking duration between the entry time and the exit time of the vehicle, and determines, based on the identification information and the parking duration, whether the parking duration has exceeded a predetermined duration.

In another aspect, the disclosure relates to a mobile robot device in communication with a cloud server and a sensor coupled to a parking lot in a parking lot. The mobile robot device includes a transceiver, a camera, a processor, and a memory. The memory stores a map of the parking lot. The transceiver receives a dispatch signal from the cloud server, the dispatch signal indicating that the sensor has detected a vehicle entering or exiting the parking lot. The processor navigates the map to direct the mobile robot device to the parking spot. Upon arriving at the parking spot, the mobile robot device captures identification information of the vehicle by the camera, and transmits, by the transceiver of the mobile robot device and to the cloud server, a wireless signal including the identification information.

Other aspects and advantages of the invention will be apparent from the following description and the appended claims.

BRIEF DESCRIPTION OF DRAWINGS

FIGS. 4A-4D show operations of parking control system according to one or more embodiments.

DETAILED DESCRIPTION

Figure 1:
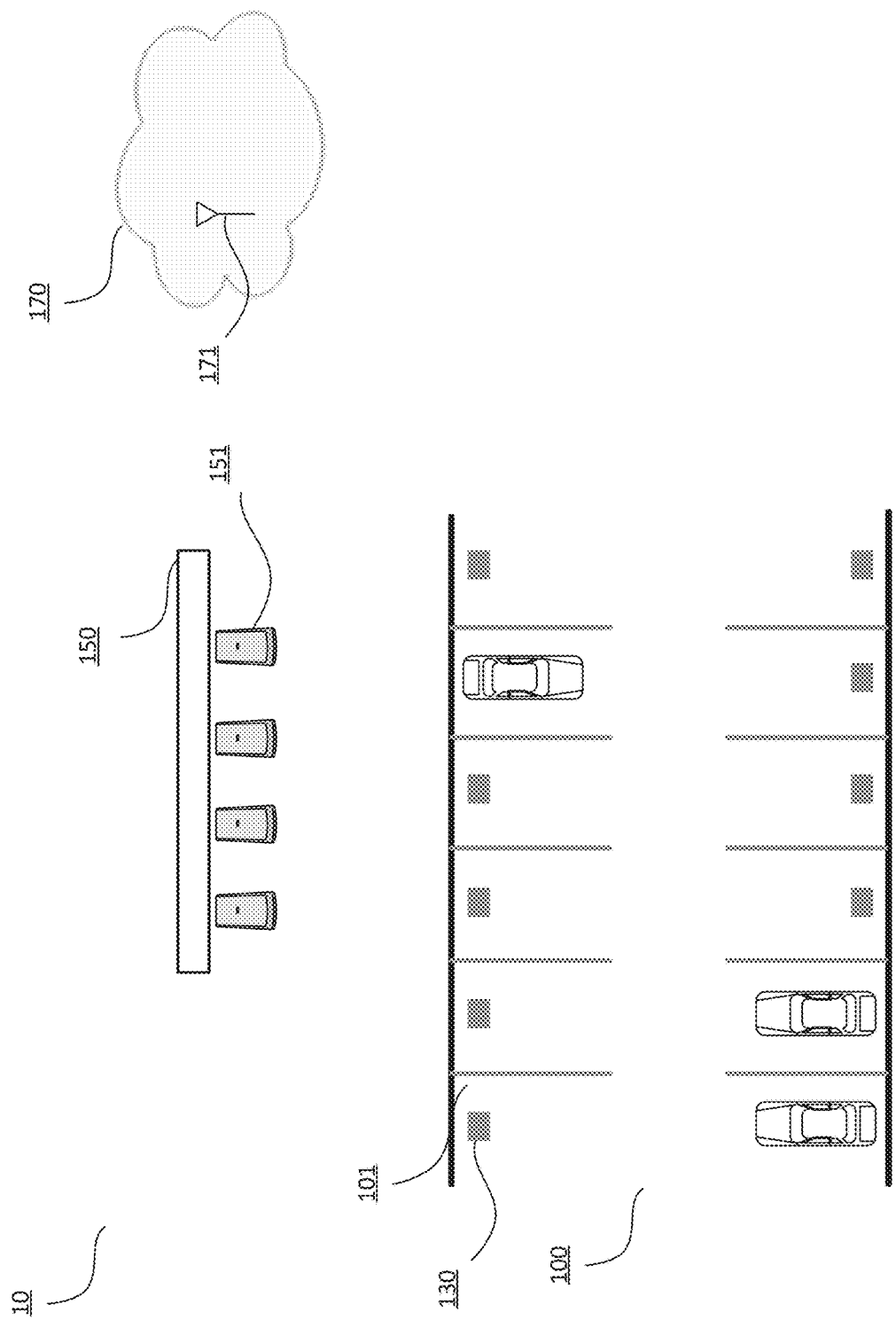
FIG. 1 shows an overview of a parking control system according to one or more embodiments.

Specific embodiments of the invention will now be described in detail with reference to the accompanying figures Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

FIG. 1 shows an overview of a parking control system 10 according to one or more embodiments. The parking control system 10 may be used for managing and controlling parking in the parking lot 100 that has a plurality of parking spots 101.

The parking control system 10 may include a sensor 130 that is coupled to a corresponding parking spot 101 in the parking lot 100, a docking station 150, a mobile robot device 151, and a cloud server 170 coupled to a transceiver 171. Detailed descriptions of these components are given in the following paragraphs with reference to the drawings. In addition to the components shown in FIG. 1, the parking control system 10 may include other components such as traffic signaling equipment, payment booth, and surveillance cameras, etc., which are commonly used in conventional parking infrastructure and thus not described in detail below.

Figure 2:
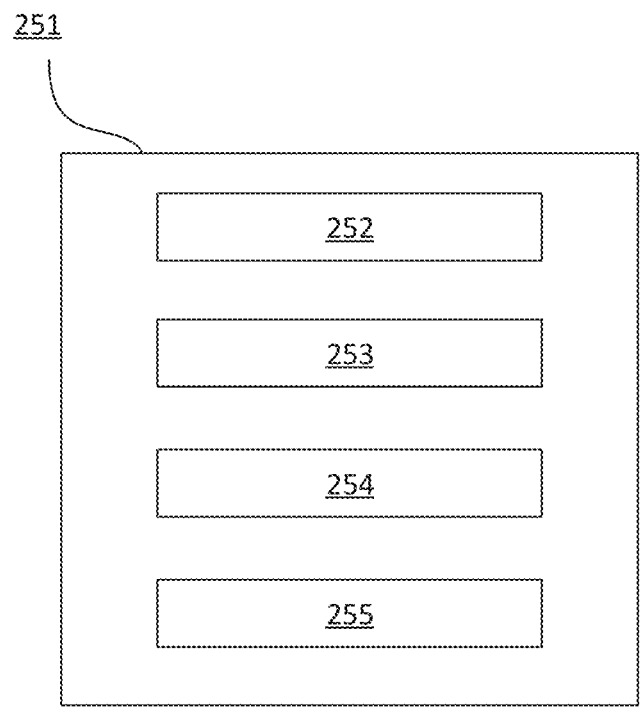
FIG. 2 is a block diagram of a mobile robot device used in a parking control system according to one or more embodiments.

FIG. 2 is a block diagram of a mobile robot device 251 used in a parking control system according to one or more embodiments. The mobile robot device 251 may include a transceiver 252, a memory 253, a processor 254, and a camera 255.

The transceiver 252 may exchange wireless signals with the cloud server and with the sensor. For example, the transceiver 252 may support Long Term Evolution (LTE), Fifth-Generation (5G), or Wi-Fi. Additionally, the transceiver 252 may exchange wireless signals with global or regional navigation systems such as Global Positioning System (GPS). While the term "transceiver" is used in the singular form throughout the disclosure, it is possible in some embodiments that multiple transceivers are physically implemented, corresponding to different types of wireless signals.

The memory 253 may store a map of the parking lot and the location of each sensor. The memory 253 may also store dispatch instructions received from the cloud server. Additionally, the memory 253 may store executable software code for navigation, communication, and/or power management.

The processor 254 may process the signals communicated with the cloud server, the sensor, and/or the navigation system, and control the operation of the mobile robot device 251. The functions executed by the processor 254 may include: locate the parking spot specified in a dispatch instruction, navigate the parking lot and direct the mobile robot device 251 to the parking spot, and perform the task assigned by the cloud server.

The camera 255 may operate at visible light frequencies or infrared frequencies and may be coupled to an ultrasonic sensor or a Light Detection and Ranging (LiDAR) sensor. The camera 255 may be able to read the exterior of a vehicle to capture identification information of the vehicle such as the license plate number. The camera 255 and the accompanying sensors may also detect the objects surrounding the mobile robot device 251 such that the processor 254 may execute collision avoidance software to prevent the mobile robot device 251 from colliding with obstacles when the mobile robot device 251 is in motion. The technology for collision avoidance is known in the art.

The mobile robot device 251 may be land-based such as a vehicle or a cart moving on wheels, or may be air-based such as a drone. The mobile robot device 251 may consume electrical power stored in a battery, or may consume other forms of energy. For the purpose of capturing the license plate number of a parked vehicle, a Lynxmotion Aluminum Rover Kit (A4WD1) may be used along with a Raspberry Pi Board and a Raspberry Pi Camera V2 Module as an example.

Figure 3:
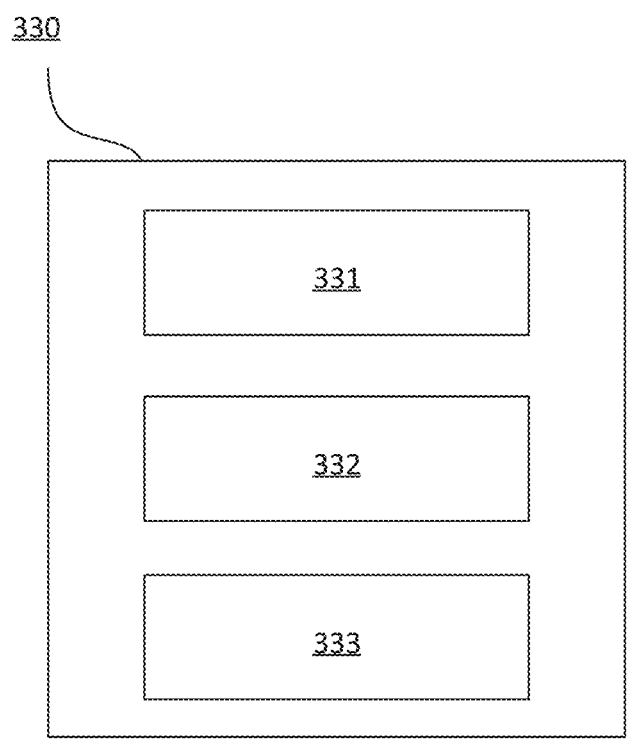
FIG. 3 is a block diagram of a sensor used in a parking control system according to one or more embodiments.

FIG. 3 is a block diagram of a sensor 330 used in a parking control system according to one or more embodiments. The sensor 330 may include a sensing circuit 331, a transmitter 332, and a power source 333.

The sensing circuit 331 may detect the entry and exit of a vehicle in and out of the parking spot monitored by the sensor 330. The sensing circuit 331 may be an ultrasonic detector or a magnetometer, or use any other suitable sensing technologies.

The transmitter 332 may transmit a wireless signal to the cloud server upon detecting the vehicle entering and exiting the parking spot. The wireless signal may include information unique to the sensor 330, such as a sensor identification or a location of the sensor 330. In this way, upon receiving the wireless signal, the cloud server is able to match the wireless signal with the specific parking spot in the parking lot. In addition to the communication with the cloud server, the transmitter 332 may communicate with the mobile robot device that is dispatched to the parking spot in order to assist the mobile robot device navigating to the parking spot.

Because the data amount of the wireless signal is typically small, the transmitter 332 may support a variety of low power connectivity technologies such as Long Range (LoRa), Narrowband IoT (NB-IoT), SigFox, ZigBee, and Z-wave.

The power source 333 may be a battery embedded in the sensor. For example, the battery may be a Lithium-thionyl chloride battery that can withstand temperatures ranging from −55° C. to +125° C. Alternatively, the power source 333 may be connected to external power sources such as a solar panel or an underground cable.

The sensor 330 may be coupled to each parking spot. For example, the sensor 330 may be disposed on or under the surface of each parking spot, embedded in a parking meter for each parking spot, or installed in a bundle with other sensors each monitoring a corresponding parking spot.

The docking station, while not illustrated in drawings in detail, may be an assembly point where mobile robot devices return from the parking lot after finishing the task. The docking station may have a direct power source or a solar panel so that the mobile robot devices may be serviced and recharged/refueled. The docking station may have cable or wireless communication links with the cloud server such that the dispatch instructions may be received by the mobile robot devices.

Operations of the parking control system according to one or more embodiments will be described below, with reference to FIGS. 4A-4D.

Figure 4A:
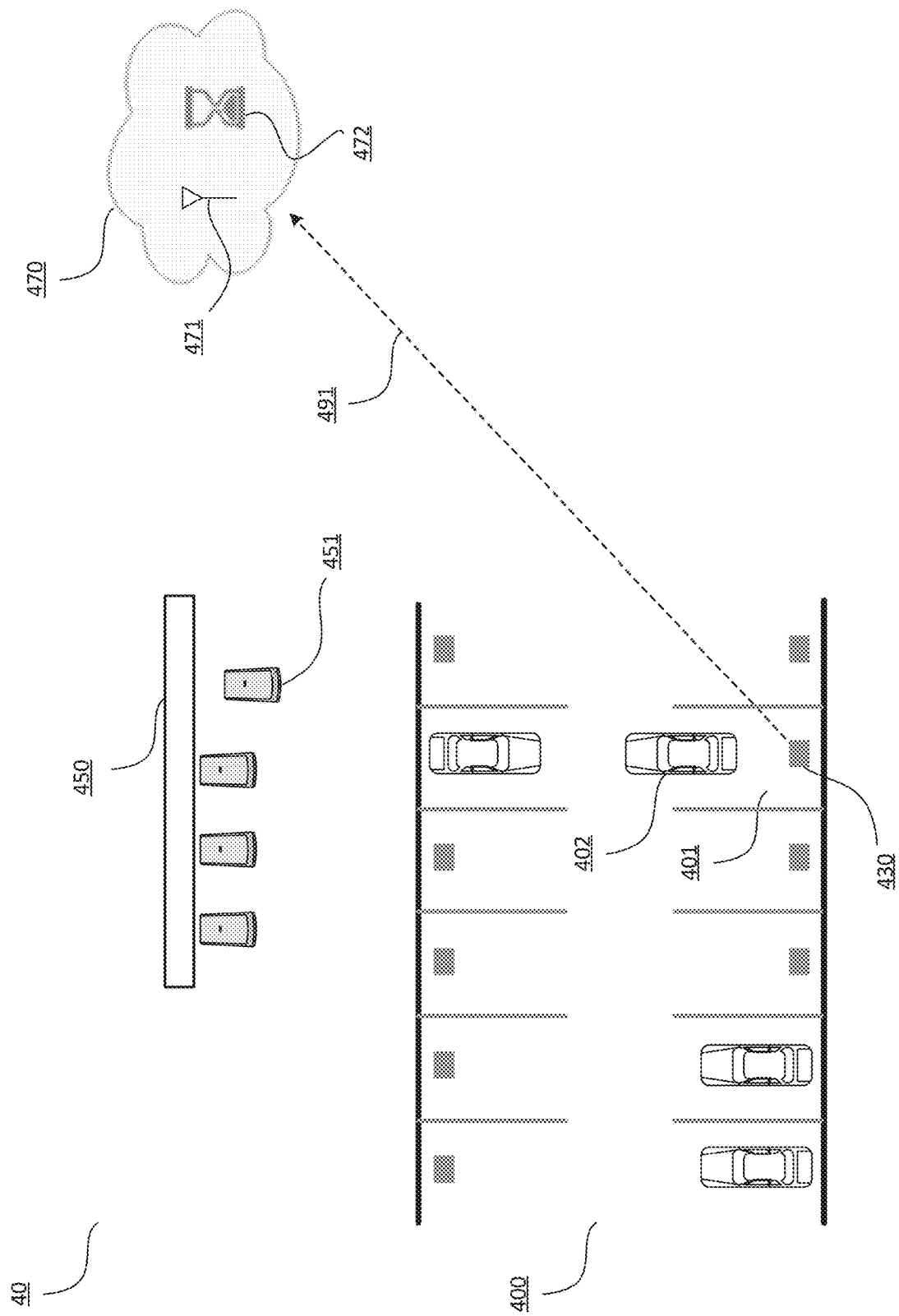
Figure 4D:
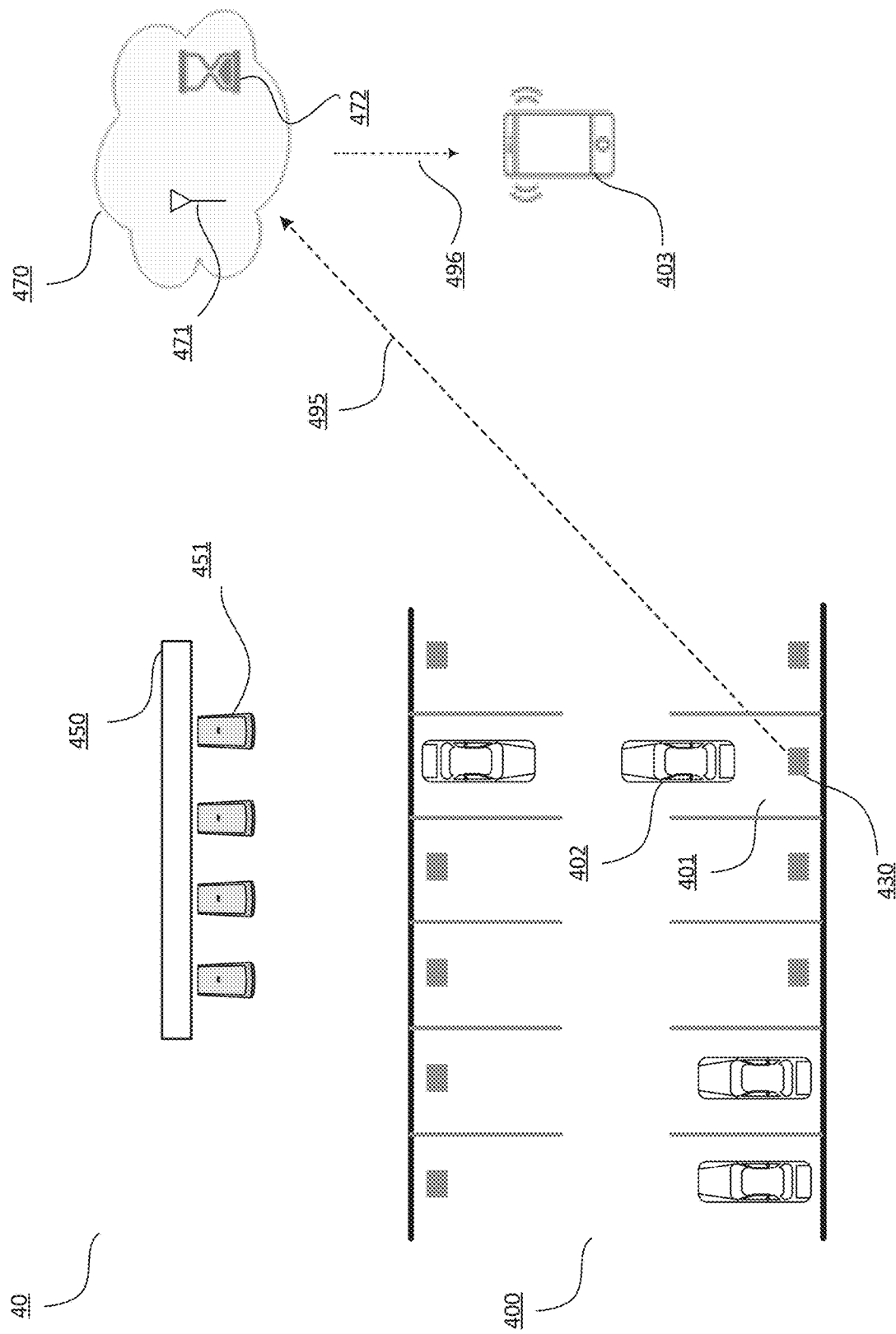

Referring to FIG. 4A, in the parking control system 40, a vehicle 402 is about to park at a parking spot 401 in the parking lot 400. The entry of the vehicle 402 may be detected by the sensor 430, which may immediately send a first wireless signal 491 to a transceiver 471 of a cloud server 470.

Upon reception of the first wireless signal 491, the cloud server 470 may record the time of reception of the first wireless signal 491 as an entry time of the vehicle 402. From the entry time, the vehicle 402 is considered as parked in the parking spot 401. The cloud server 470 may thus start a timer 472 to measure the duration of parking.

The cloud server 470 may then dispatch a mobile robot device 451 from the docking station 450 to the parking spot 401. In some situations where, e.g., there are no mobile robot devices available in the docking station 450 or the distance between the docking station 450 and the parking spot 402 is too long, the cloud server 470 may instead dispatch a mobile robot device that has been dispatched to another parking spot and has not yet returned to the docking station 450. These situations may be particularly common during the rush hours of the parking lot 400. In the event the mobile robot device 451 has been dispatched to a plurality of parking spots, the mobile robot device 451 may follow the dispatches one after another.

After being dispatched to the parking spot 401, the mobile robot device 451 may navigate the parking lot 400 and find its way to the parking spot 401. In the navigation process, the mobile robot device 451 may rely on the map stored in its memory, and may use signals from external navigation systems. Additionally, the mobile robot device 451 may communicate with the sensor 430 that is attached to the parking lot 401 and use the signal received from the sensor 430 to assist the navigation. Because the parking lot 400 often has busy vehicle and pedestrian traffic, the processor of the mobile robot device 451 may execute collision avoidance programs during the navigation.

Referring to FIG. 4B, after the mobile robot device 451 arrives at the parking lot 401, the mobile robot device 451 may use its camera to capture identification information of the vehicle 402. For example, the mobile robot device 451 may capture a picture of the license plate 403 of the vehicle 402. In addition, the mobile robot device 451 may capture pictures of places such as the windshield or the dashboard where special parking permits may be found. After capturing the pictures, the mobile robot device 451 may transmit a second wireless signal 492 with the captured pictures to the transceiver 471 of the cloud server 470. In the event the cloud server 470 finds out that the pictures are not properly captured, the cloud server 470 may communicate with the mobile robot device 451 and ask the mobile robot device 451 to retake the pictures. Once the pictures are accepted by the cloud server 470, the mobile robot device 451 may then return to the docking station 450, if no pending dispatch instructions are found in the memory, or continue to the next parking spot, if there are still pending dispatch instructions in the memory.

Often a parked vehicle is allotted with a predetermined duration for parking. Keeping with FIG. 4B, the cloud server 470 may calculate a balance time based on the entry time, the current timer reading, and the predetermined duration. When the balance time is low, i.e., less than a threshold, the cloud server 470 may search in a database for the contact information of the operator (represented as 403 in FIGS. 4B-4D) of the vehicle 402. If the contact information is found, the cloud server 470 may send a notification such as a text message to the operator 403 to remind the operator 403 of the impending expiration of the allotted parking time. Sometimes the predetermined duration is dependent on the identity of the parked vehicle. In these situations, the predetermined duration may be obtained after the cloud server 470 receives the second wireless signal 492. In some embodiments, there may be a plurality of thresholds, and the operator 403 may thus receive multiple notifications before the allotted parking time expires.

Sometimes a parking spot is reserved only for vehicles with certain authorization or permission. Referring to FIGS. 4B and 4C, upon reception of the second wireless signal 492, the cloud server 470 may determine whether the vehicle 402 is authorized to park in the parking spot 400 based on the identification information. If the vehicle 402 is not authorized, then the cloud server 470 may send a notification 494 to the operator 403. The notification 494 may be a notice of parking violation.

Referring to FIG. 4C, when the vehicle 402 exits the parking spot 401, the sensor 430 may detect the exit of the vehicle 402 and transmit a third wireless signal 495 to the cloud server 470. Upon reception of the third wireless signal, the cloud server may record an exit time of the vehicle and stop the timer 472.

With the entry time and exit time both recorded, the cloud server 470 may calculate the parking duration of the vehicle 402. The cloud server 470 may thus determine the fee for the parking and also determine, based on the identification information and the parking duration, whether the parking duration has exceeded the predetermined duration. If the parking duration has exceeded the predetermined duration, the cloud server 470 may send a notification 496 to the operator 403. The notification 496 may be a notice of parking violation.

The cloud server 470 may include one or more computers. The cloud server 470 may be a computer server for general purposes or one specially designed for parking control. In some embodiments, the cloud server 470 may be implemented on an IoT platform. In some embodiments, the cloud server 470 may be implemented within the mobile robot device 451. In this case, the first wireless signal 491, shown in FIG. 4A, may be directly sent to the mobile robot device 451 which may then autonomously dispatch itself to the parking spot 401. The cloud server 470 may include some or all elements of a typical computing system that is described later with reference to FIG. 7.

While a number of operations of the parking control system according to one or more embodiments are described above with reference to FIGS. 4A-4D, it is noted that not all of these operations are required to be performed. For example, in some embodiments, the cloud server 470 may be configured not to calculate the balance time until the predetermined duration expires, and/or not to send the notification 493 to the operator 403 as a reminder of the impending expiration of the allotted time. As another example, in some embodiments, the cloud server 470 may be configured not to determine whether the vehicle 402 is authorized to park in the parking spot 401 based on the identification information, and/or not to send the notification 494 to the operator 403. It is further noted that there is no requirement that the operations must be performed in the same order as they are described. For example, in some embodiments, the cloud server 470 may be configured to determine parking authorization after the vehicle 402 exits the parking spot 401.

Figure 5A:
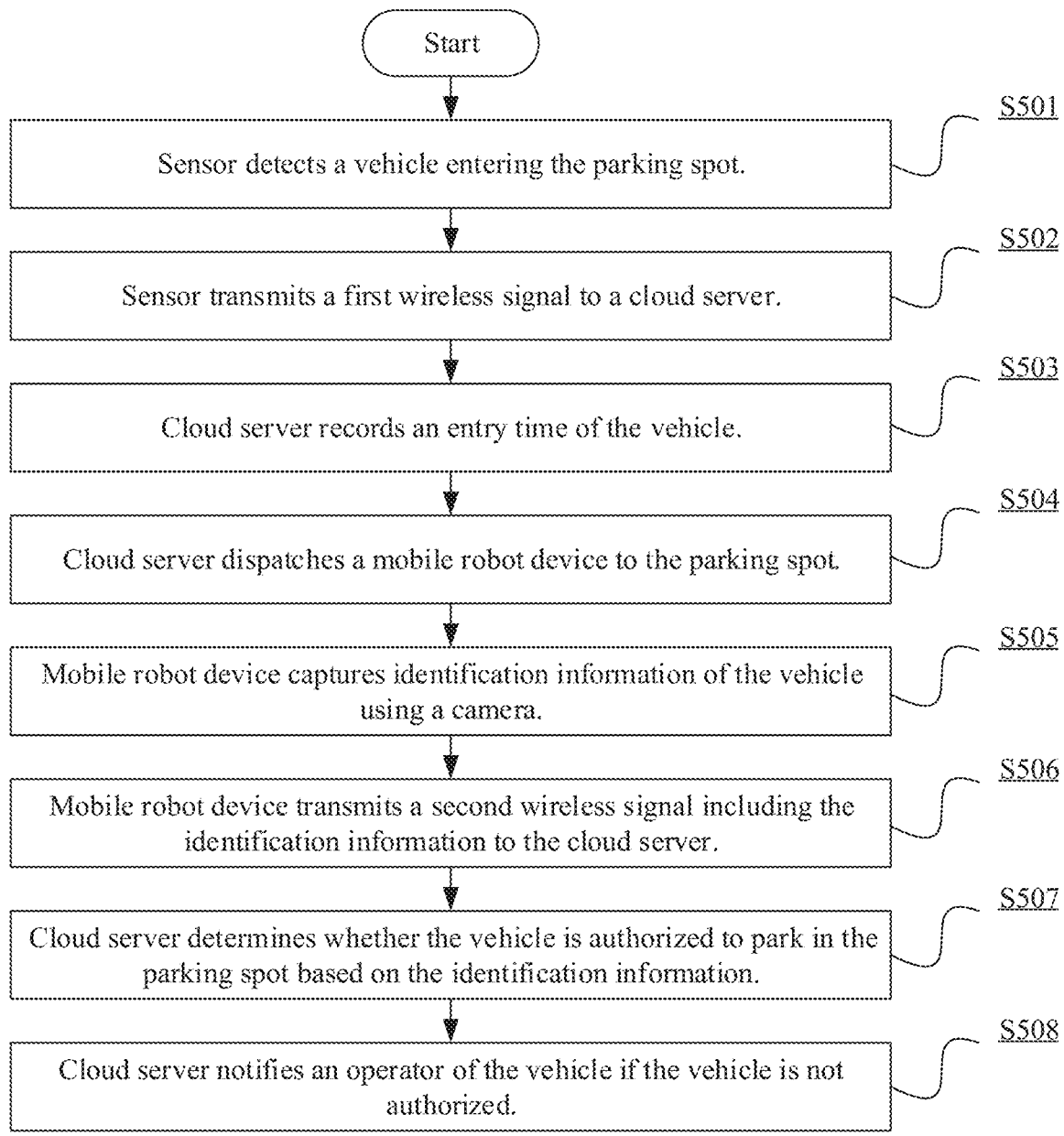
FIG. 5A is a flowchart showing steps of a parking control method according to one or more embodiments.
Figure 5B:
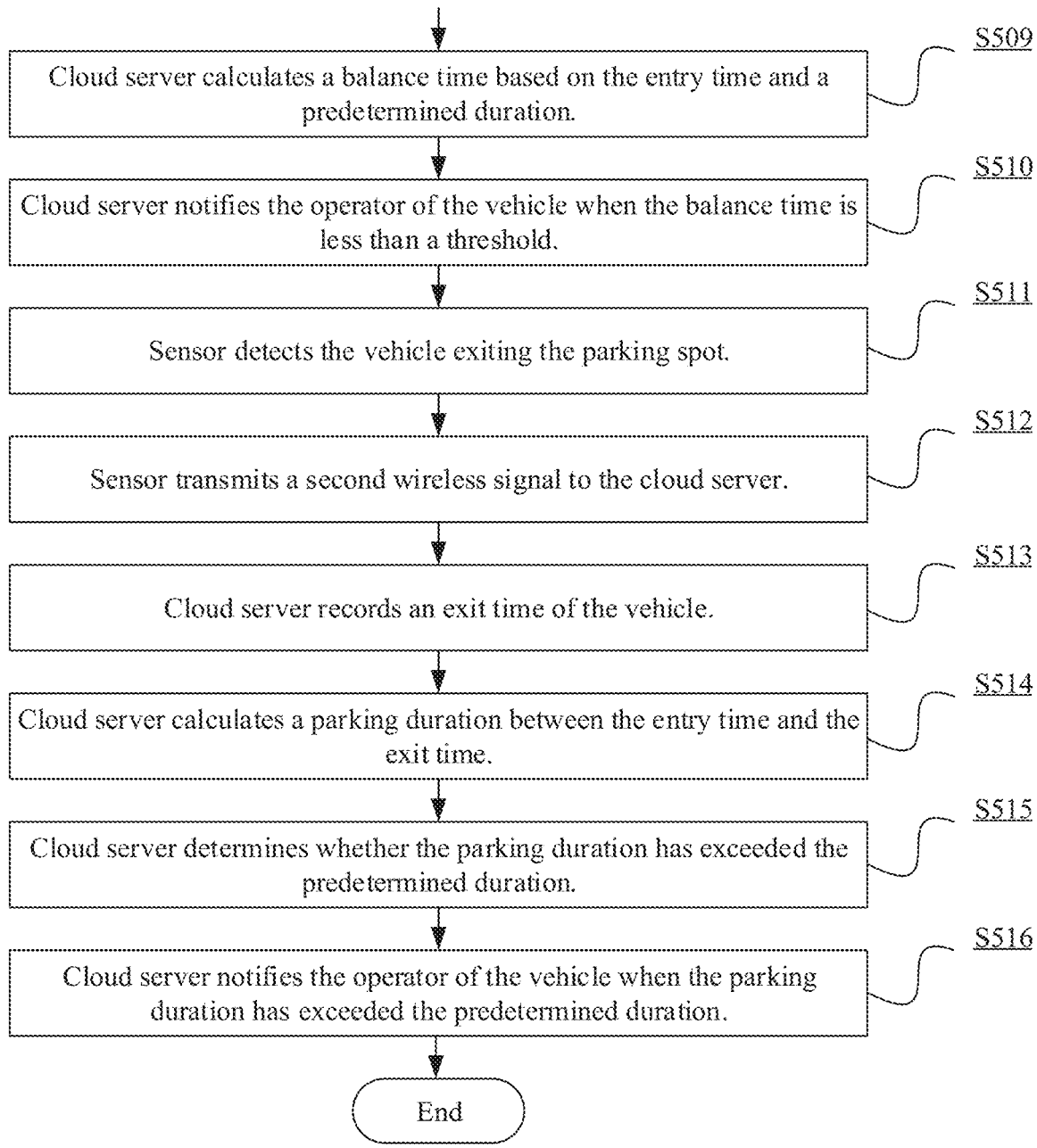
FIG. 5B is a continuation of FIG. 5A.

FIGS. 5A and 5B together show a flowchart describing steps of a parking control method according to one or more embodiments. The steps described below may or may not correspond to the operations of the parking control system described above.

At S501, a sensor coupled to a parking spot in a parking lot detects a vehicle entering the parking spot.

At S502, the sensor transmits a first wireless signal to a cloud server.

At S503, the cloud server records an entry time of the vehicle upon reception of the first wireless signal.

At S504, the cloud server dispatches a mobile robot device to the parking spot of the parking lot.

At S505, the mobile robot device captures identification information of the vehicle using a camera.

At S506, the mobile robot device transmits a second wireless signal including the identification information to the cloud server.

At S507, the cloud server determines whether the vehicle is authorized to park in the parking spot based on the identification information.

At S508, the cloud server notifies an operator of the vehicle if the vehicle is not authorized.

At S509, the cloud server calculates a balance time based on the entry time and a predetermined duration.

At S510, the cloud server notifies the operator of the vehicle when the balance time is less than a threshold.

At S511, the sensor detects the vehicle exiting the parking spot.

At S512, the sensor transmits a second wireless signal to the cloud server.

At S513, the cloud server records an exit time of the vehicle.

At S514, the cloud server calculates a parking duration between the entry time and the exit time.

At S515, the cloud server determines whether the parking duration has exceeded the predetermined duration.

At S516, the cloud server notifies the operator of the vehicle when the parking duration has exceeded the predetermined duration.

While a number of steps of the parking control method according to one or more embodiments are described above with reference to FIGS. 5A-5B, it is noted that not all of these steps are required, and there is no requirement that the steps must be performed in the same order as they are described. For example, some embodiments may not necessarily have steps S509 and S510. For example, in some embodiments, steps S507 and S508 may take place between steps S510 and S511, and, in some other embodiments, steps S507 and S508 may take place between steps S513 and S514.

Figure 6:
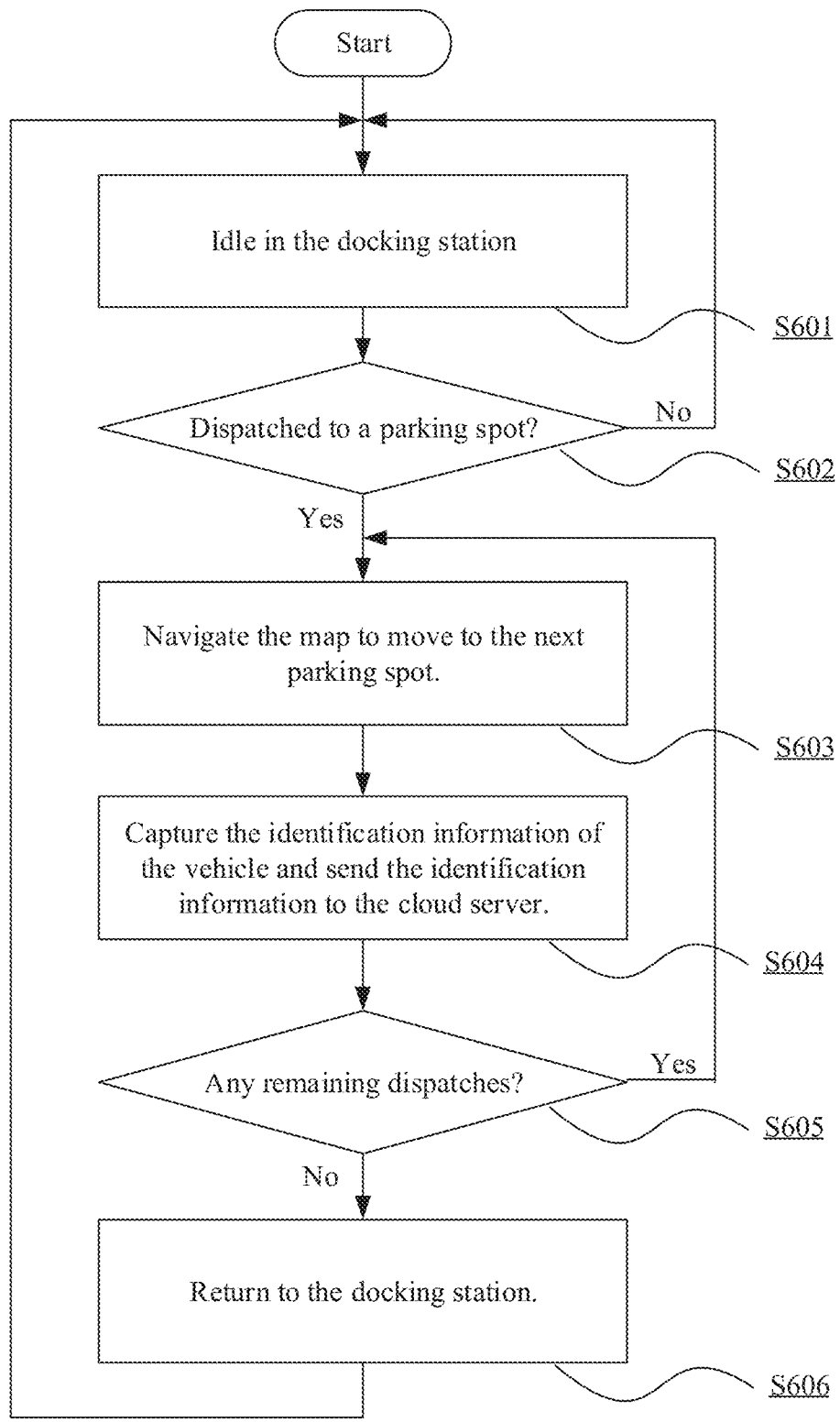
FIG. 6 is a flowchart showing steps performed by a mobile robot device in a parking control system according to one or more embodiments.

FIG. 6 is a flowchart showing steps performed by a mobile robot device in a parking control system according to one or more embodiments. As mentioned earlier, the mobile robot device may be dispatched to one or more parking spots before returning to the docking station. The mobile robot device thus may execute the steps shown in FIG. 6 to fulfil the tasks dispatched to it.

At S601, the mobile robot device may stay in the docking station idle when no dispatch instruction is received.

At S602, the mobile robot device may check whether a dispatch instruction has been received. The checking may be implemented as an active periodic inquiry to a port, a receiver, a register, or a memory address of the mobile robot device. The checking may alternatively be implemented as a passive response to an event such as the execution of an interrupt program or the power-on of a circuit module. If a dispatch instruction has not been received, the mobile robot device may remain idle. If a dispatch instruction has been received, the mobile robot device may move to execute step S603.

At S603, the mobile robot device may navigate the map of the parking lot and move to the parking spot that the mobile robot device is dispatched to. In the event the mobile robot device has been dispatched to more than one parking spots, the mobile robot device may execute a ranking algorithm to determine the order of the parking spots to visit. The ranking algorithm may be time-based such as first-come-first-serve, may be distance-based such as closest-spot-first, or may be based on a priority system such as reserved-spot-first.

At S604, the mobile robot device may capture the identification information of the vehicle and send the identification information to the cloud server.

At S605, the mobile robot device may determine whether there are remaining dispatches to be addressed. If the answer is Yes, then the mobile robot device may execute S603 for the next parking spot. If the answer is No, the mobile robot device may execute S606 to return to the docking station.

In addition to the above description, embodiments of the parking control system and the parking control method may implement functions for exception handling. For example, in case the mobile robot device fails to find the parking spot during navigation, the mobile robot device may attempt to communicate with the cloud server and the sensor of the parking spot for a limited amount of time and may return to the docking station after timeout and reporting the same to the cloud server. As another example, in case the sensors of two adjacent parking spots both detect the entry of a vehicle at about the same time, and the vehicle identifications collected at both parking spots are the same, then the cloud server may determine that this is a "double parking" scenario where a single vehicle is parked in two spots. Further, because the operator of a vehicle may use a mobile terminal to communicate with the cloud server, the cloud server may help the operator find the vehicle in case the operator has forgotten the spot where the vehicle was parked.

Figure 7:
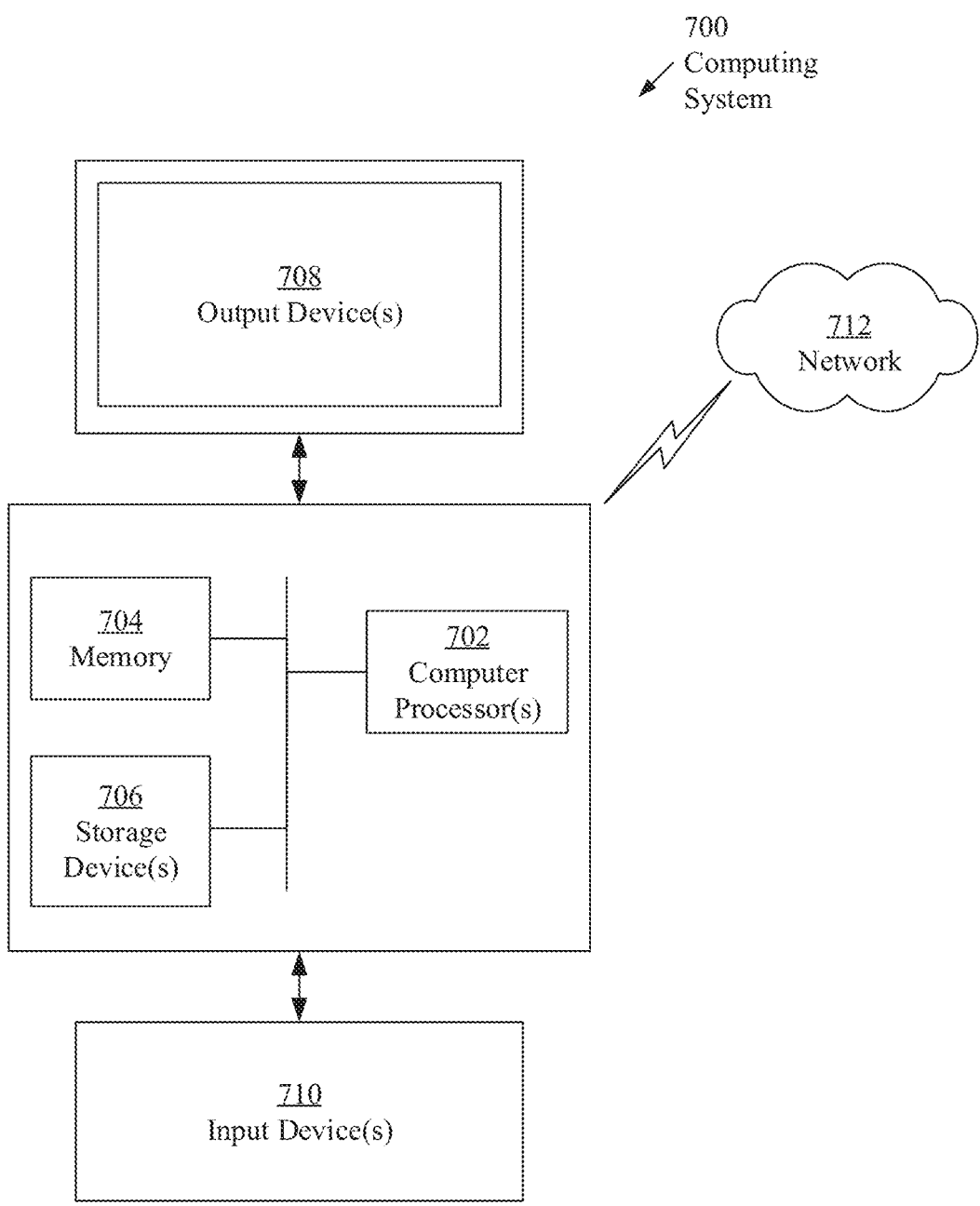
FIG. 7 shows a computing system in which components of a parking control system may be implemented according to one or more embodiments.

FIG. 7 shows a computing system in accordance with one or more embodiments of the invention. Embodiments of the invention may be implemented on a computing system. Any combination of mobile, desktop, server, embedded, or other types of hardware may be used. For example, as shown in FIG. 7, the computing system 700 may include one or more computer processor(s) 702, associated memory 704 (e.g., random access memory (RAM), cache memory, flash memory, etc.), one or more storage device(s) 706 (e.g., a hard disk, an optical drive such as a compact disk (CD) drive or digital versatile disk (DVD) drive, a flash memory stick, etc.), and numerous other elements and functionalities. The computer processor(s) 702 may be an integrated circuit for processing instructions. For example, the computer processor(s) may be one or more cores, or micro-cores of a processor. The computing system 700 may also include one or more input device(s) 710, such as a touchscreen, keyboard, mouse, microphone, touchpad, electronic pen, or any other type of input device. Further, the computing system 700 may include one or more output device(s) 708, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 700 may be connected to a network 712 (e.g., a local area network (LAN), a wide area network (WAN) such as the Internet, mobile network, or any other type of network) via a network interface connection (not shown). The input and output device(s) may be locally or remotely (e.g., via the network 712) connected to the computer processor(s) 702, memory 704, and storage device(s) 706. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system 700 may be located at a remote location and connected to the other elements over a network 712. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

With the features described above, embodiments of the invention may advantageously simplify parking process and improve parking management efficiency and accuracy.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A parking control method, comprising:
    detecting, by a sensor coupled to and physically installed on a parking spot in a parking lot, a vehicle entering the parking spot;
    transmitting, by the sensor and to a cloud server, a first wireless signal;
    recording, by the cloud server upon reception of the first wireless signal, an entry time of the vehicle;
    dispatching, by the cloud server, a mobile robot device to the parking spot;
    communicating between the mobile robot device and the sensor while the mobile robot device is dispatched to the parking spot;
    capturing, by the mobile robot device, identification information of the vehicle using a camera;
    transmitting, by the mobile robot device and to the cloud server, a second wireless signal including the identification information of the vehicle;
    detecting, by the sensor, the vehicle exiting the parking spot;
    transmitting, by the sensor and to the cloud server, a third wireless signal;
    recording, by the cloud server upon reception of the third wireless signal, an exit time of the vehicle;
    calculating, by the cloud server, a parking duration between the entry time and the exit time; and
    determining, based on the identification information and the parking duration, whether the parking duration has exceeded a predetermined duration.

2. The parking control method according to claim 1, further comprising:
    calculating, by the cloud server and before receiving the third wireless signal, a balance time based on the entry time and the predetermined duration; and
    sending, by the cloud server, a first notification to an operator of the vehicle when the balance time is less than a threshold.

3. The parking control method according to claim 1, further comprising:
    sending, by the cloud server, a second notification to an operator of the vehicle when the parking duration has exceeded the predetermined duration.

4. The parking control method according to claim 1, further comprising:
    navigating, by the mobile robot device, a map of the parking lot to arrive at the parking spot.

5. The parking control method according to claim 1, wherein, when the mobile robot device is dispatched to a plurality of parking spots, the mobile robot device captures the identification information of the vehicle of each of the plurality of parking spots one after another.

6. The parking control method according to claim 1, wherein the mobile robot device returns to a docking station after transmitting the second wireless signal.

7. The parking control method according to claim 1, wherein the identification information comprises a license plate number of the vehicle.

8. The parking control method according to claim 1, wherein the sensor is an ultrasonic sensor.

9. The parking control method according to claim 1, further comprising:

determining, by the cloud server and upon reception of the second wireless signal, whether the vehicle is authorized to park in the parking spot based on the identification information; and sending, by the cloud server, a third notification to an operator of the vehicle if the vehicle is not authorized.

10. A parking control system, comprising:

a cloud server coupled to a transceiver;

a sensor comprising a sensing circuit and a transmitter, wherein the sensor is coupled to and physically installed on a parking spot in a parking lot; and a mobile robot device comprising a transceiver and a camera, wherein the sensor detects, by the sensing circuit, a vehicle entering the parking spot, and transmits, by the transmitter and to the cloud server, a first wireless signal;

wherein the cloud server, upon reception of the first wireless signal by the transceiver of the cloud server, records an entry time of the vehicle, and dispatches the mobile robot device to the parking spot;

wherein the mobile robot device communicates with the sensor while being dispatched to the parking spot;

wherein the mobile robot device captures identification information of the vehicle by the camera, and transmits, by the transceiver of the mobile robot device and to the cloud server, a second wireless signal including the identification information;

wherein the sensor further detects, by the sensing circuit, the vehicle exiting the parking spot, and transmits, by the transmitter and to the cloud server, a third wireless signal;

wherein the cloud server, upon reception of the third wireless signal by the transceiver of the cloud server, records an exit time of the vehicle; and wherein the cloud server further calculates a parking duration between the entry time and the exit time of the vehicle, and determines, based on the identification information and the parking duration, whether the parking duration has exceeded a predetermined duration.

11. The parking control system according to claim 10, wherein, before receiving the third wireless signal, the cloud server calculates a balance time based on the entry time and the predetermined duration, and sends a first notification to an operator of the vehicle when the balance time is less than a threshold.

12. The parking control system according to claim 10, wherein, when the parking duration has exceeded the predetermined duration, the cloud server sends a second notification to an operator of the vehicle.

13. The parking control system according to claim 10, wherein the mobile robot device further comprises: a processor; and a memory storing a map of the parking lot; and wherein the processor navigates the map to direct the mobile robot device to the parking spot.

14. The parking control system according to claim 10, wherein, when the mobile robot device is dispatched to a plurality of parking spots, the mobile robot device captures the identification information of the vehicle of each of the plurality of parking spots one after another.

15. The parking control system according to claim 10, further comprising a docking station, wherein the mobile robot device returns to the docking station after transmitting the second wireless signal.

16. The parking control system according to claim 10, wherein the identification information comprises a license plate number of the vehicle.

17. The parking control system according to claim 10, wherein the sensor is an ultrasonic sensor.

18. The parking control system according to claim 10, wherein the cloud server, upon reception of the second wireless signal, determines whether the vehicle is authorized to park in the parking spot based on the identification information; and wherein the cloud server sends a third notification to an operator of the vehicle if the vehicle is not authorized.

19. A mobile robot device in communication with a cloud server and a sensor coupled to and physically installed on a parking spot in a parking lot, the mobile robot device comprising:

a transceiver; a camera; a processor; and a memory, wherein the memory stores a map of the parking lot;

wherein the transceiver receives a dispatch signal from the cloud server, the dispatch signal indicating that the sensor has detected a vehicle entering or exiting the parking lot;

wherein the processor navigates the map to direct the mobile robot device to the parking spot;

wherein the transceiver communicates with the sensor while the mobile robot device is dispatched to the parking spot; and wherein, upon arriving at the parking spot, the mobile robot device captures identification information of the vehicle by the camera, and transmits, by the transceiver of the mobile robot device and to the cloud server, a wireless signal including the identification information.

* * * * *